Patented Aug. 15, 1939

2,169,741

UNITED STATES PATENT OFFICE 2,169,741

PROCESS FOR THE MANUFACTURE OF ALLOYS AND IN PARTICULAR OF FERROALLOYS OR OF INOXIDIZABLE STEELS

René Perrin, Paris, France, assignor to Societe d'Electrochimie d'Electrometallurgie et des Acieries Electriques d'Ugine, Paris, France, a corporation of France No Drawing. Application July 11, 1938, Serial No. 218,627. In France July 22, 1937

7 Claims. (Cl. 75—27)

It is known to make ferro-alloys with low carbon contents, for example ferro-chromium, by processes based on silico-thermy by making firstly an alloy rich in silicon, for example a silico-chromium or ferro-silicon with a low carbon content and then by causing this alloy rich in silicon to react upon a mixture of the ore of the basis metal of the alloy which it is desired to make, and an energetic base for example lime.

In the case of the manufacture of ferro-chromium the following reaction is used

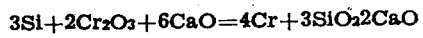
$$3Si+2Cr_2O_3+6CaO=4Cr+3SiO_2 2CaO$$

In order to obtain a good yield of the operation while leaving little $Cr_2O_3$ in the slag, experiment proves that it is necessary to add a very considerable proportion of lime.

The reaction is clearly exothermic, the heat evolved being equal to the sum of the heats produced on the one hand by the reduction of the iron and chromium oxides by the silicon and on the other hand by the formation of the bicalcium silicate starting from the nascent silica and from the lime.

This operation may be effected by reaction between the metal rich in silicon in the molten state, and a synthetic slag previously molten into the fluid state. To effect it there may be used in particular apparatus for successive and reciprocal pourings, such as those described in the French Patent No. 780,125 of the applicant, which apparatus permits, by an alternating or rotary movement precipitating the metal and the slag at the same time from one chamber into another, with energy an intermixing of the slag and of the metal to be obtained which leads to rapid and complete operations.

In the above mentioned French patent the applicant had foreseen the possibility of charging into the apparatus, slag in the solid state, if the latent heat of the metal was sufficiently large to melt the slag, but this could not be the case when the quantities of slag are very considerable with respect to the metal, of the order of 3 to 5 times by weight for example, and even more if alloys with high silicon contents are used.

The applicant has made tests to determine if it is possible to utilize the exothermicity of the reaction in order to be able to charge in the solid state, a part of the slag or even the whole of it, if care is taken to preheat to high temperature, 1300° C. for example. The difficulties met with have been of many distinct orders, in the first place the elements of the slag to be formed, which is of very considerable weight, are extremely refractory, the lime in particular, and also in the case of the manufacture of ferro-chromium, the chromium ore. Moreover, a very considerable part of the evolution of heat is furnished by the formation of calcium silicate and it is thus impossible to have the evolution of heat necessary unless the double reaction of the Si on the chromium oxide, and of the silica thus formed on the lime is obtained, which reaction is only produced very slowly if the lime and the chromium oxide are not molten. Finally the operation being accomplished without any application of external heat, it is necessary that in a very short time the materials charged shall not only melt but also give rise to a very fluid slag. If the slag is not fluid the reaction stops or its speed is considerably reduced, so that by reason of external losses of heat the mass cools down, the intensity of the reaction diminishes again and there is obtained finally a pasty magma.

The problem is on the contrary solved by the process forming the subject of the present invention.

This process is characterised by the fact that, in an apparatus such as the pouring apparatus mentioned above or in any other equivalent apparatus, the exothermic reaction is effected between one or more materials intended to effect the reaction, previously brought to the molten state, and the other materials of the reaction, if desired preheated, of which the slag is at least part, in the solid state, the charging of the solid materials into the apparatus being effected in one or more stages with repeated pourings following each charge, each of these charges comprising a quantity of solid materials responding to the two following conditions: viz. being as considerable as possible to diminish the interruptions of the operation and being sufficiently small so that these solid materials immediately give rise to a molten and fluid slag.

The solid materials may be charged either cold or previously heated; other things being equal one may charge at each time a more considerable quantity of preheated solid materials than of cold solid materials. If initially only a small portion of elements in the solid state is charged on the metallic bath the reaction will none the less start by a series of oscillations or rotations of the pouring apparatus even if the solid elements added have a high melting point and only give rise to a small quantity of molten slag.

On the other hand if from the beginning molten slag is charged and if the quantity of this slag is sufficient the solid elements may be charged in one stage.

To sum up, all the methods of charging of these solid elements may be utilized on condition, however, that the following essential rule is observed: the reaction must be started by charging at the beginning a certain quantity of molten fluid slag or by producing the formation of this slag in the apparatus by charging in the solid state a small quantity of the elements of the preheated slag and by causing them to react with the fluid metal by imparting a few oscillations or rotations to the apparatus; and then adding during the operations the rest of the elements of the slag in the cold or preheated solid state, the proportion of each of these additions of slag with respect to the contents of the apparatus at the instant of addition, taking into account the temperature of these contents, being so chosen that the slag in the molten and fluid state is always maintained in the apparatus.

Under these conditions experiment shows the following surprising fact: although the double reaction mentioned above which generates the heat necessary for heating and for dissolving the elements of the slag charged in the solid state causes three or more phases to take part, viz. two liquid phases: molten metal and slag, and one or more solid phases: elements such as lime and chromium ores, this reaction takes place with great rapidity and the operation may be carried out to the end by maintaining liquid slag and by finishing with a charge practically completely molten and with the obtaining of the slag-metal equilibrium necessary for the good yield of the operation.

Thus for example if there are charged molten ferro-silico-chromium and molten chromium ore, and solid cold lime is progressively charged while causing the apparatus to oscillate or turn, the reaction which causes the three phases to take part namely, metal, molten chromium ore and solid lime, starts and takes place rapidly and the ferro-chromium is obtained with a high yield and in a very short time. It is a very remarkable fact that this reaction with three phases is produced practically with the same speed as if everything had been molten at the beginning, (which speed is necessary for the losses not to excessively cool the whole), on condition of taking the essential precaution of only adding the solid materials in quantities such that there exists always in the apparatus a molten fluid slag.

This is even more remarkable since if solid additions (of lime for example) are made in a furnace even upon an extremely fluid slag on top of a metal, and if the slag and metal have the same compositions and are in the same relative proportions as those which take part in the pouring apparatus, the solution of the lime is relatively slow despite the heating, and in all cases is of a duration incompatible with the process described above.

All modifications compatible with the calorific schedule of the reaction are possible if the essential disclosed rules are observed; starting by slag charged in liquid form or rendered immediately liquid, and the maintenance of a fluid slag. In particular as indicated there may be only charged elements of the slag in the solid state and strongly preheated or a small quantity of molten slag and a considerable quantity of slag elements solid and a little less preheated, or even a relatively considerable quantity of molten slag and the rest in the solid and cold state. The portion of the slag charged in the molten state may for example only comprise a single one of the elemnts of the slag, for example chromium ore in the case of ferro-chromium, all the lime being charged in the solid state, or the molten slag may comprise a mixture of lime and ore in any proportions, the complement of additions of these elements in the solid state being made in proportions such that the final desired composition is obtained. Finally, in the case when a part of the molten slag is charged at the beginning, the metal itself may be charged wholly or partially in the solid state which has as a consequence only to increase the proportion of slag which it is necessary to charge in the molten state or the temperature to which the rest is heated.

Two examples of the process are given below.

(1) *Operation with ferro-silicon with 94.30% of silicon.*—Into the mixing apparatus were poured 236 kgs. of a molten slag obtained by fusion of a mixture composed of 100 parts of chromium ore and 30 parts of lime.

There have been added 35.5 kgs. of ferro-silicon in the solid cold state (Si=94.30%) and 62.5 kgs. of lime in the solid and cold state.

After intermixing for about 2–3 minutes the very fluid metal and slag are poured.

There is obtained 81 kgs. of ferro-chromium of the following composition:

| | Per cent |
|---|---|
| Cr | 69.32 |
| C | 0.035 |
| Si | 0.25 | the rest being substantially iron.

(2) *Operation with solid ore and lime preheated to 1450° C.*—At its outlet from the furnace there have been poured into the mixing apparatus 150 kgs. of molten ferro-silicon-chromium of the following analysis:

| | Per cent |
|---|---|
| Si | 47 |
| Cr | 37.5 | the rest being substantially iron.

Very rapidly have been charged:

Firstly about 75 kgs. of a mixture in the solid state of 100 parts of chromium ore and 65 parts of lime previously preheated to 1450° C.

The charge was then agitated by successive oscillations of the mixing apparatus for one minute:

Secondly about 200 kgs. of the same preheated mixture were added, and agitations were again performed for one minute.

Thirdly 360 kgs. of this same preheated mixture were added, and agitation was performed rapidly for two minutes.

The sum of the additions amounted to 635 kgs. of mixture in the solid state—chromium ore and lime preheated to 1450° C.

After pouring 238 kgs. were obtained of an alloy the composition of which was

| | Per cent |
|---|---|
| Cr | 70.85 |
| C | 0.07 |
| Si | 0.72 | the rest being substantially iron.

Obviously, the fact of applying the same fundamental means of the process or its modifications with reducing alloys comprising bodies other than silicon or alloys of silicon, such for example as aluminium, calcium, titanium does not constitute a departure from the scope of the invention, with the object of obtaining ferro-alloys or alloys other than those with a basis of iron. It would be the same if these fundamental means or their modifications were applied to the manufacture of inoxidizable steels.

I claim:

1. In the process of making an alloy by reacting an oxygen compound of the alloy metal, a reducing agent and a strong base, the reduction of the oxygen compound being exothermic in character and the reducing agent being such that the reduction product combines with the base exothermically, the steps which comprise charging a portion of the reagents into a mixing receptacle in the molten state and the remainder in the solid state, and violently mixing the reagents by pouring them back and forth from one chamber to another a plurality of times to initiate and maintain the reaction between the reagents, the portion of the reagents added in the solid state being sufficiently small as to produce a molten fluid slag.

2. In the process of making an alloy by reacting an oxygen compound of the alloy metal, a reducing agent and a strong base, the reduction of the oxygen compound being exothermic in character and the reducing agent being such that the reduction product combines with the base exothermically, the steps which comprise charging a portion of the reagents into a mixing receptacle in the molten state and the remainder in the solid state in a plurality of stages, and violently mixing the reagents and pouring them back and forth from one chamber to another a plurality of times to initiate and maintain the reaction between the reagents, the portion of the reagents added in the solid state in each stage being sufficiently small as to produce a molten fluid slag.

3. In the process of making an alloy by reacting an oxygen compound of the alloy metal, a reducing agent and a strong base, the reduction of the oxygen compound being exothermic in character and the reducing agent being such that the reduction product combines with the base exothermically, the steps which comprise charging a portion of the reagents into a mixing receptacle in the molten state and the remainder in the solid preheated state, and violently mixing the reagents by pouring them back and forth from one chamber to another a plurality of times to initiate and maintain the reaction between the reagents, the portion of the reagents added in the solid preheated state being sufficiently small as to produce a molten fluid slag.

4. In the process of making an alloy by reacting an oxygen compound of the alloy metal, a reducing agent and a strong base, the reduction of the oxygen compound being exothermic in character and the reducing agent being such that the reduction product combines with the base exothermically, the steps which comprise charging a portion of the reagents into a mixing receptacle in the molten state and the remainder in the solid state, and violently mixing the reagents by pouring them back and forth from one chamber to another a plurality of times to initiate and maintain the reaction between the reagents, the portion of the reagents added in the solid state being sufficiently small as to produce a molten fluid slag, the total amount of slag being at least three times the amount of alloy produced.

5. In the process of making an alloy by reacting an oxygen compound of the alloy metal, a silicon reducing agent and lime, the steps which comprise charging a portion of the reagents into a mixing receptacle in the molten state and the remainder in the solid state, and violently mixing the reagents by pouring them back and forth from one chamber to another a plurality of times to initiate and maintain the reaction between the reagents, the portion of the reagents added in the solid state being sufficiently small as to produce a molten fluid slag.

6. In the process of making a ferrous alloy by reacting an oxygen compound of the alloy metal, a ferro-silicon reducing agent and lime, the steps which comprise charging a portion of the reagents into a mixing receptacle in the molten state and the remaider in the solid state, and violently mixing the reagents by pouring them back and forth from one chamber to another a plurality of times to initiate and maintain the reaction between the reagents, the portion of the reagents added in the solid state being sufficiently small as to produce a molten fluid slag.

7. In the process of making an alloy by reacting an oxygen compound of the alloy metal, a reducing agent and a strong base, the reduction of the oxygen compound being exothermic in character and the reducing agent being such that the reduction product combines with the base exothermically, the steps which comprise charging a portion of the reagents into a mixing receptacle in the molten state and the remainder in the solid state, the portion of the reagents in the molten state containing insufficient excess heat to melt the portion added in the solid state, and violently mixing the reagents by pouring them back and forth from one chamber to another a plurality of times to initiate and maintain the reaction between the reagents, the portion of the reagents added in the solid state being sufficiently small as to produce a molten fluid slag.

RENÉ PERRIN.